_US008122338B2_

United States Patent
von Tetzchner et al.

(10) Patent No.: US 8,122,338 B2
(45) Date of Patent: Feb. 21, 2012

(54) DISTINGUISHING AND DISPLAYING TABLES IN DOCUMENTS

(75) Inventors: Jon Stephenson von Tetzchner, Oslo (NO); Geir Ivarsoy, Oslo (NO)

(73) Assignee: Opera Software ASA, Oslo (NO)

( * ) Notice: Subject to any disclaimer, the term of this patent is extended or adjusted under 35 U.S.C. 154(b) by 2079 days.

(21) Appl. No.: 10/936,552

(22) Filed: Sep. 9, 2004

(65) Prior Publication Data

US 2005/0076292 A1  Apr. 7, 2005

Related U.S. Application Data

(60) Provisional application No. 60/507,513, filed on Oct. 2, 2003.

(30) Foreign Application Priority Data

Sep. 11, 2003  (NO) .................................. 20034035

(51) Int. Cl.
*G06F 17/22* (2006.01)
*G06F 17/27* (2006.01)
(52) U.S. Cl. ......... 715/227; 715/234; 715/238; 715/243
(58) Field of Classification Search .................. 715/509, 715/513, 517, 227, 234, 243, 238
See application file for complete search history.

(56) References Cited

U.S. PATENT DOCUMENTS

| | | | | |
|---|---|---|---|---|
| 4,713,871 A | * | 12/1987 | Araki et al. .................. 29/421.2 |
| 5,021,995 A | * | 6/1991 | Quint et al. ................... 707/101 |
| 5,022,261 A | * | 6/1991 | Wolfson et al. ................. 73/149 |
| 5,428,805 A | * | 6/1995 | Morgan ........................ 708/141 |
| 6,336,124 B1 | | 1/2002 | Alam |
| 6,639,611 B1 | | 10/2003 | Leduc |
| 6,839,575 B2 | * | 1/2005 | Ostergaard .................... 455/566 |
| 6,865,720 B1 | | 3/2005 | Otani et al. |
| 6,871,319 B2 | * | 3/2005 | Taboada et al. ............... 715/509 |
| 7,065,704 B1 | * | 6/2006 | Xu ................................. 715/509 |
| 2002/0038384 A1 | * | 3/2002 | Khan et al. .................... 709/245 |
| 2004/0049737 A1 | * | 3/2004 | Simon Hunt et al. ......... 715/513 |

FOREIGN PATENT DOCUMENTS

JP         2000 339301          8/2000

OTHER PUBLICATIONS

PCT Written opinion in PCT/NO2004/000267.
Anonymous, "Creating Accessible PAge LAyouts", University of Toronto, Feb. 20, 2003.

* cited by examiner

*Primary Examiner* — Stephen Hong
*Assistant Examiner* — Wilson Tsui
(74) *Attorney, Agent, or Firm* — Christian D. Abel

(57) ABSTRACT

A method, a client terminal and a computer program for presenting on a display a (X)HTML document which includes a table. The table in the (X)HTML document is examined and determined to be a true table or a non-true table. If the table is determined to be a true table, the content of the table, including its table structure, is presented on the display. If the table is determined to be a non-true table, the table is formatted by rejecting the table structure, and the content of the table is presented as a linear structure on the display. The invention is particularly suitable for presenting HTML documents, including tables, on a client terminal with a display with a limited number of horizontal pixels, such as a mobile telephone or a PDA.

16 Claims, 4 Drawing Sheets

DISTINGUISHING AND DISPLAYING TABLES IN DOCUMENTS

This application claims the benefit of U.S. Provisional Patent Application 60/507,513, filed 2 Oct. 2003.

FIELD OF THE INVENTION

The present invention relates to the field of data processing for displaying information on electronic communication terminals. More particularly, the invention relates to a method, a client terminal, and a computer program for presenting a markup language document that includes a table, on a display. In order to optimize such presentation, particularly on a narrow display, the invention distinguishes between true tables, that is tables used for functional/structural purposes, and non-true tables, that is tables used for layout/design purposes.

The invention also relates to a method, a client terminal, and a computer program for determining if a table in a markup language document is a true table or a non-true table.

BACKGROUND OF THE INVENTION AND PRIOR ART

A Web browser, (X)HTML and CSS user agent, or UA for short) is a computer program executed at a client computer connected to a network such as the Internet, for enabling the client to access content on servers connected to the network. A Web browser includes a user interface, and a computer program portion for addressing a particular server and a particular document on the network. Also, a Web browser includes a computer program portion for displaying the content of a markup language document, in particular an (X)HTML document, received from a Web server via a network using the HTTP protocol, on a display connected to the client computer.

In the present disclosure, "a markup language document" should be understood as a structured document that, in addition to text, also includes particular tags/elements that define a format change or a hypertext link. Applicable examples of markup language documents are HTML, cHTML, HTML Mobile Profile, and XHTML documents, or alternatively XML documents. Markup language documents are in the following description denoted by the common term (X)HTML.

Most of the existing content of the World Wide Web is designed for desktop computers with large color monitors. Mobile wireless communication devices, such as mobile telephones, PDAs, or palmtop computers typically have much smaller displays. Ordinary television screens, which also may be used for displaying Web content, typically have a lower horizontal resolution than the common computer monitors, and will thus have similar properties.

In the present disclosure, when characterizing a display, the term "narrow" should be interpreted in terms of the number of horizontal pixels present in the display. As an example, a display with less than 350 pixels horizontally may be considered as "a narrow display". The present invention will be particularly applicable for use with even narrower displays, such as a display with approximately 200 pixels horizontally.

To be able to display Web content on such a narrow display, prior art Web browsers have included formatting techniques that more or less intelligently remove or change the sizes on elements of the pages.

Most Web content is made using different versions of the HyperText Markup Language (HTML) as defined by the World Wide Consortium (W3C). Tables, a part of the standard, are widely used to position page elements such as graphics and text. Prior art methods used by Web browsers to format Web content for small screens fall into these categories:

- Use zoom on the complete page to scale all elements
- Change the size of the different table elements and their respective content to fit the width of the screen
- Remove all table elements and display content without tables The first approach above has the advantage that pages look familiar to the user. However, when elements are shrunk without any other formatting, images and text sizes are likely to become too small and often not even readable. The second approach has an advantage on screen sizes between 350 pixels and 600 pixels width. The third approach has an advantage on screen sizes smaller than 350 pixels in width.

The table element was originally implemented into the HTML standard as a way to structure information on Web pages. However, Web-content creators (Web designers) soon realized that tables could be used to position (design) for example graphic elements in more ways than HTML intended to. This practice was soon adopted by most Web designers, and is still the most used way to create Web content. W3C warned about the consequences of this malpractice in the HTML 4.0 standard: (http://www.w3.org/TR/REC-html40/struct/tables.html.)

W3C's recommendation states that, "tables should not be used purely as a means to layout document content as this may present problems when rendering to non-visual media. Additionally, when used with graphics, these tables may force users to scroll horizontally to view a table designed on a system with a larger display. To minimize these problems, authors should use style sheets to control layout rather than tables."

Unfortunately, the practice of using style sheets to control layout has only been adapted by a limited number of Web sites, and the table layout is by far the most common approach.

While the prior art formatting approaches mentioned above have had successful results on many Web sites, none of these techniques has been able to create a satisfying solution for pages containing tables. In particular, none of the prior art solutions seems to deal with or solve the problem of distinguishing between true tables and non-true tables when displaying a Web page.

SUMMARY OF INVENTION

An object of the present invention is to provide a method, a device and a computer program for presenting a markup language document that includes a table on a display, while overcoming the above-mentioned disadvantages of the prior art.

A particular object of the invention is to provide such a method, a client terminal, and a computer program that distinguishes between true tables and non-true tables in a document.

A further object of the invention is to provide such a method, a client terminal, and a computer program that displays the document in an improved way, based on the distinguishing between true tables and non-true tables in the document.

The above objects are achieved by means of a method, a client terminal, and a computer program as set forth in the appended independent claims. The features indicated in the dependent claims achieve further objects and advantages.

The invention provides a way to identify whether a table is a true table, intended to display structured information, or a non-true table, which is intended to work as a framework to position elements (i.e. design and layout tables). According to the invention, only tables that fit the criteria of a true table are displayed as tables, while non-true tables (i.e. design and layout tables) are either rejected or subjected to formatting suited for smaller screens.

BRIEF DESCRIPTION OF THE DRAWINGS

The invention will be described in greater detail with reference to the drawings, in which.

DETAILED DESCRIPTION OF INVENTION

Figure 1:
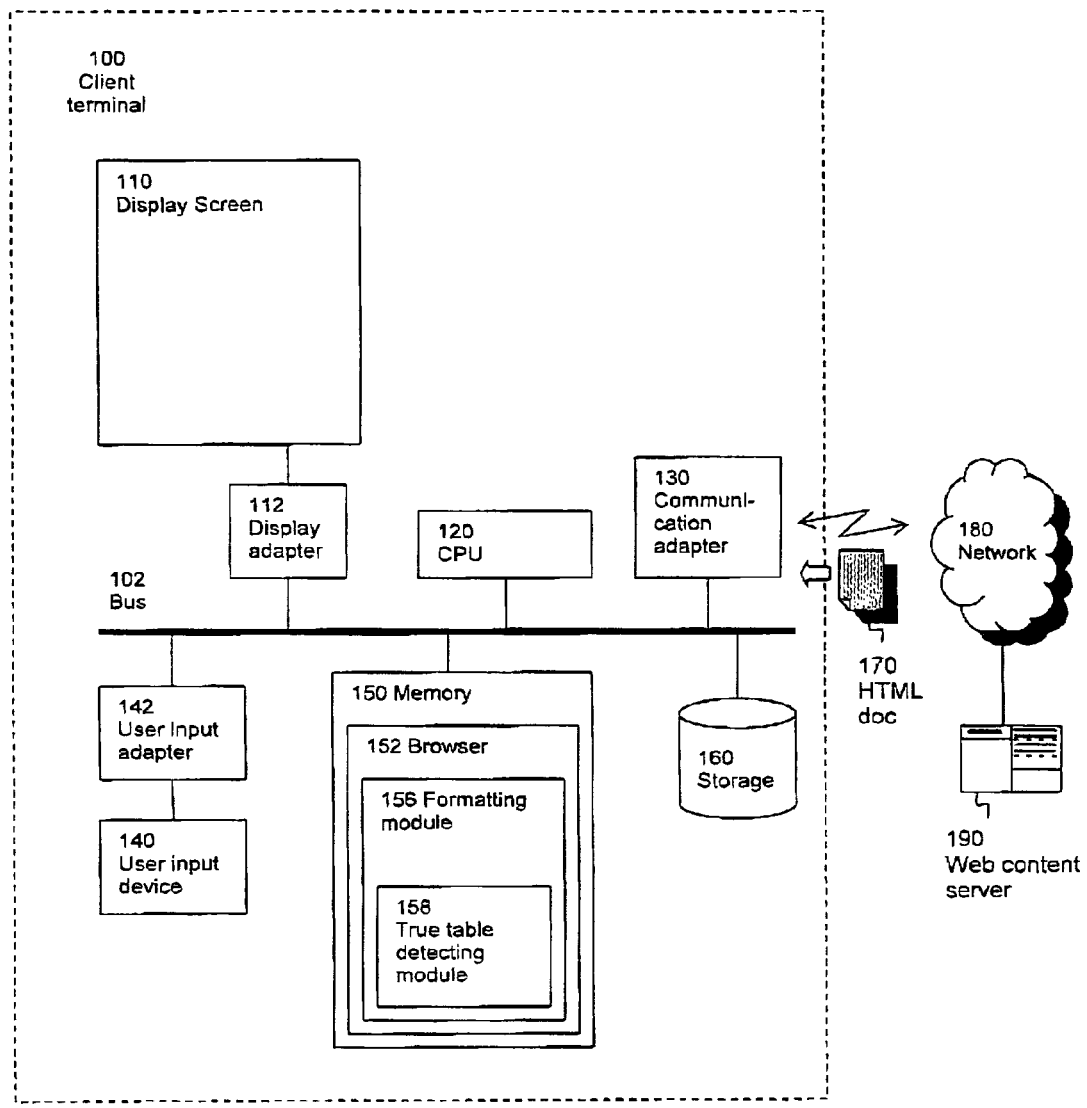
FIG. 1 is a block diagram of a system that includes a client terminal according to the invention.

FIG. 1 is a block diagram of a system that includes a client terminal according to the invention.

The client terminal 100 is typically a mobile communication terminal with a small- or medium-sized display, for example a mobile telephone, a PDA, or a palmtop computer.

The client terminal 100 comprises a small- or medium-sized display 110, more specifically a narrow display 110, which in the first place is not appropriate for presenting a general (X)HTML content designed for a large display screen. More specifically, the display 110 is not appropriate for presenting an (X)HTML document which includes true and non-true tables.

The client terminal 100 further comprises an internal bus 102 and a display adapter 112 interconnecting the bus and the display 110.

The client terminal 140 further comprises a user input device 140, such as a keyboard and/or a pointing device such as a touch pad or a mouse. A user input adapter 142 interconnects the bus 102 and the input device 140.

The internal bus 102 is further connected to a central processing unit 120, arranged to execute instructions embodied in a computer program retained in the memory 150, which is also connected to the bus 102.

The computer program in the memory 150 particularly comprises a Web browser 152.

The Web browser 152 comprises computer program portions for accessing a requested resource or content, in particular an (X)HTML document 170, from a Web server 110 connected via a communications network to the browser 152 at the client terminal 100. The browser also comprises computer program portions for displaying the content of the (X)HTML document on the display 110 of the client terminal 100. Such ordinary browser features are regarded as well known to those skilled in the art, and are included in common Web browsers such as the Opera browser, Netscape Navigator, and Internet Explorer.

In particular, the browser program 152 comprises a formatting module 156, which is novel and exceptional to the present invention. The formatting module is arranged to perform a method according to the invention as described below with reference to FIG. 2. The formatting module 156 further includes a true-table detecting module 158, which is also novel and exceptional to the present invention. The true-table detecting module is arranged to perform a method according to the invention with reference to the true-table determining process 210 disclosed below.

The bus 102 may further be connected to data storage 160 for non-volatile storage of programs and/or data.

An (X)HTML document 170 is provided by a server 110 through a communication network 180 to a communication adapter 130 connected to the bus 102 in the client terminal 100. The network 180 is enabled for providing wireless mobile communication with the client terminal 100 and for communication with an (X)HTML content server 190. Thus, the network 180 illustrated may typically comprise both the Internet and a mobile communication network such as a GSM network, or alternatively a GPRS, UMTS, CDMA, or PCS network. The communication adapter 130 may thus be a GSM, GPRS, UMTS, CDMA, or PCS module, adapted for interoperability with the mobile communication network included in the network 180.

Figure 2:
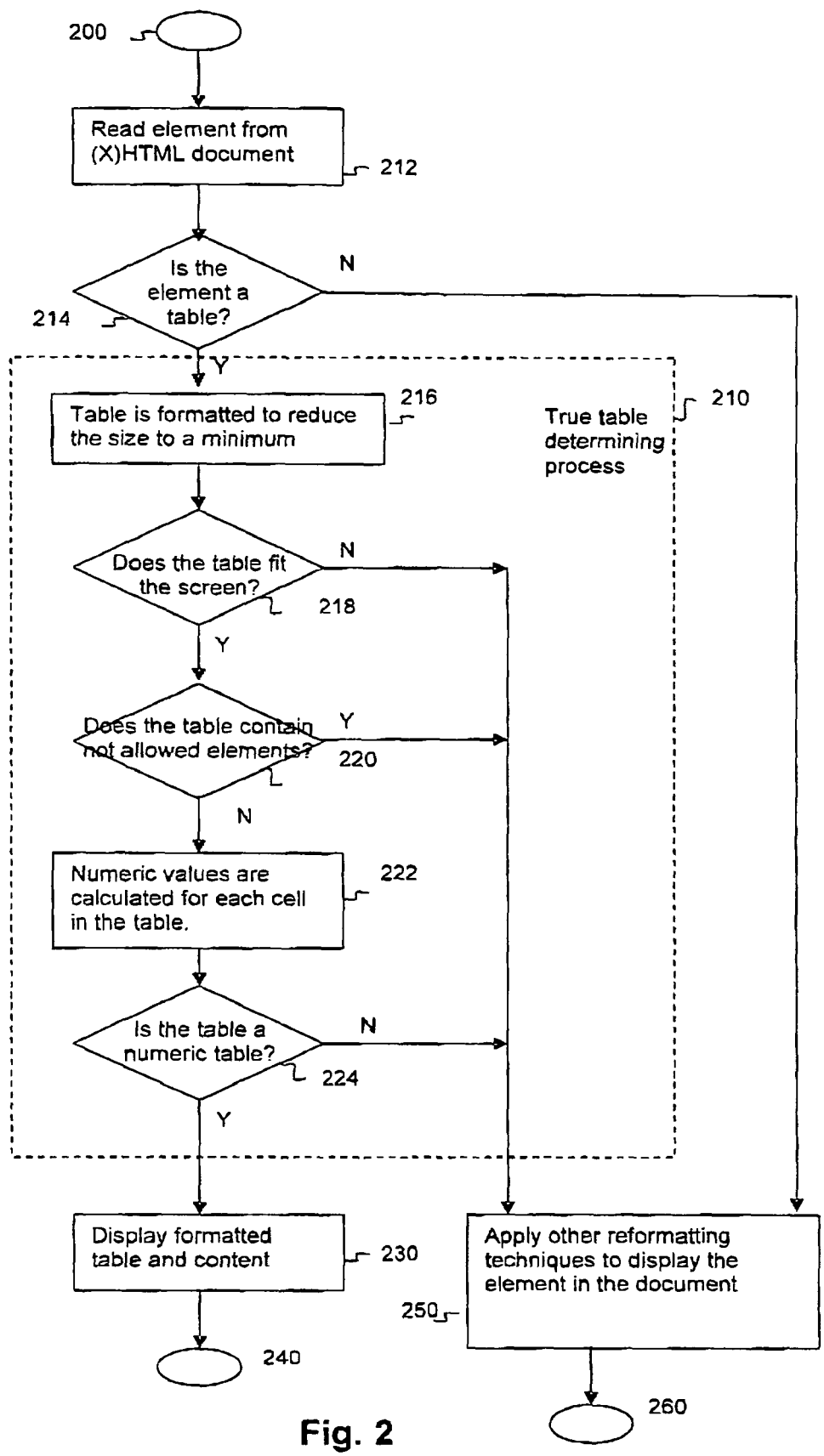
FIG. 2 is a flowchart of an embodiment of the method according to the invention, FIG. 3 (screenshot) depicts an example of a Web page with a non-true table and a true table, each displayed with its original table structure, according to prior art, FIG. 4 (screenshot) depicts the Web page displayed on a narrow display, wherein both table structures are rejected and the content is displayed without its original table structure, and FIG. 5 (screenshot) depicts the Web page, displayed on a narrow display, wherein the structure of the non-true table is rejected, while the structure of the true table is maintained, according to the invention.

FIG. 2 is a flowchart that illustrates an embodiment of the method according to the invention.

The illustrated process is performed by the browser 152 when executed by the processing unit 120 in the client terminal 100 illustrated in FIG. 1.

The (X)HTML document 170 generally contains a table.

The process starts at the starting step 200.

The process presupposes that a (X)HTML document 170 the is input by the communication adapter 130 and read by the formatting module 156 in the browser 152.

An initial reading step 212 is performed. In this step the process reads an element from the document 170.

Next, in decision step 214, a test is performed in order to decide if the currently read element in the (X)HTML document 170 is a table. If this is the case, the process continues to the true table determining sub-process 210. Else, the process continues at 250, described below.

If the element is a table, the process further comprises a true-table determining sub-process 210. In this sub-process, the input table is determined to be a true table or a non-true table.

The sub-process 210 starts with the size reduction step 216, wherein the table is formatted to reduce the table size to a minimum. In particular, styling is removed from the table in order to minimize the size of the table.

Next, in the decision step 218, a test is performed in order to decide if the table fits the screen. If this is the case, the process continues at step 220. Else, the sub-process 210 exits and the process continues at step 250, which implies that the table is determined to be a non-true table.

Next, in the decision step 220, a test is performed in order to decide if the table contains non-allowable elements, such as other tables, large images, and Flash movies. If the table does not contain non-allowable elements, the process continues at the calculation step 222. Else, the sub-process exits and the process continues at step 250, which implies that the table is determined to be a non-true table.

Next, in the calculating step 222, numeric values are calculated for each cell in the table. In this step, the density of numeric cells among the cells in the table is determined.

Next in the decision step 224, a test is performed to decide if the table is a numeric table, and thus a true table. In this step, the table is determined to be as a non-numeric table and thus a non-true table if the density of numeric cells is less than a predetermined percentage value. In a preferred embodiment, the table is established as a non-numeric table and thus a non-true table if the density of numeric cells is less than a predetermined percentage value in the range 20% to 60%. Even more preferred the percentage value is between 30 and 50%. Most preferred, and favorably with regard to the performance and reliability of the true table determining sub-process 210, the percentage value is approximately 40%.

Else, if the density of numeric cells is greater than the predetermined percentage value, the table is determined to be a true table.

The density of numeric cells is preferably determined by determining the total number $n_{tot}$ of cells in the table, determining the number $n_{num}$ of cells containing a majority of numeric characters, and establishing said density as the fraction $n_{num}/n_{tot}$ Preferably, the characters "0" through "9" and "+", "−", "%" and "." are considered as numeric characters.

If the test in the calculating step 222 is successful, the sub-process exits and the process continues at 230, which implies that the table is determined to be a true table. Else, the process continues at step 250, which implies that the table is determined to be a non-true table.

Next, in the presentation step 230, the formatted document is presented on the display 180.

The presentation step 250 (other formatting technique) advantageously includes a converting process for converting the (X)HTML document, which optimizes the document for display on a narrow screen without the need for horizontal scrolling Preferably, this is achieved by adapting the document to the display by enforcing a client-side style sheet. In an example of this type of adaptation, the display value for table cell elements is set to either "block-level" or "inline".

The converting process included in the presentation step 250 preferably further comprises steps for ignoring subsequent line breaks, steps for converting or omitting huge images, steps for downsizing medium-sized images, and steps for detecting and omitting ornamental graphics and commercial advertisements.

Figure 3:
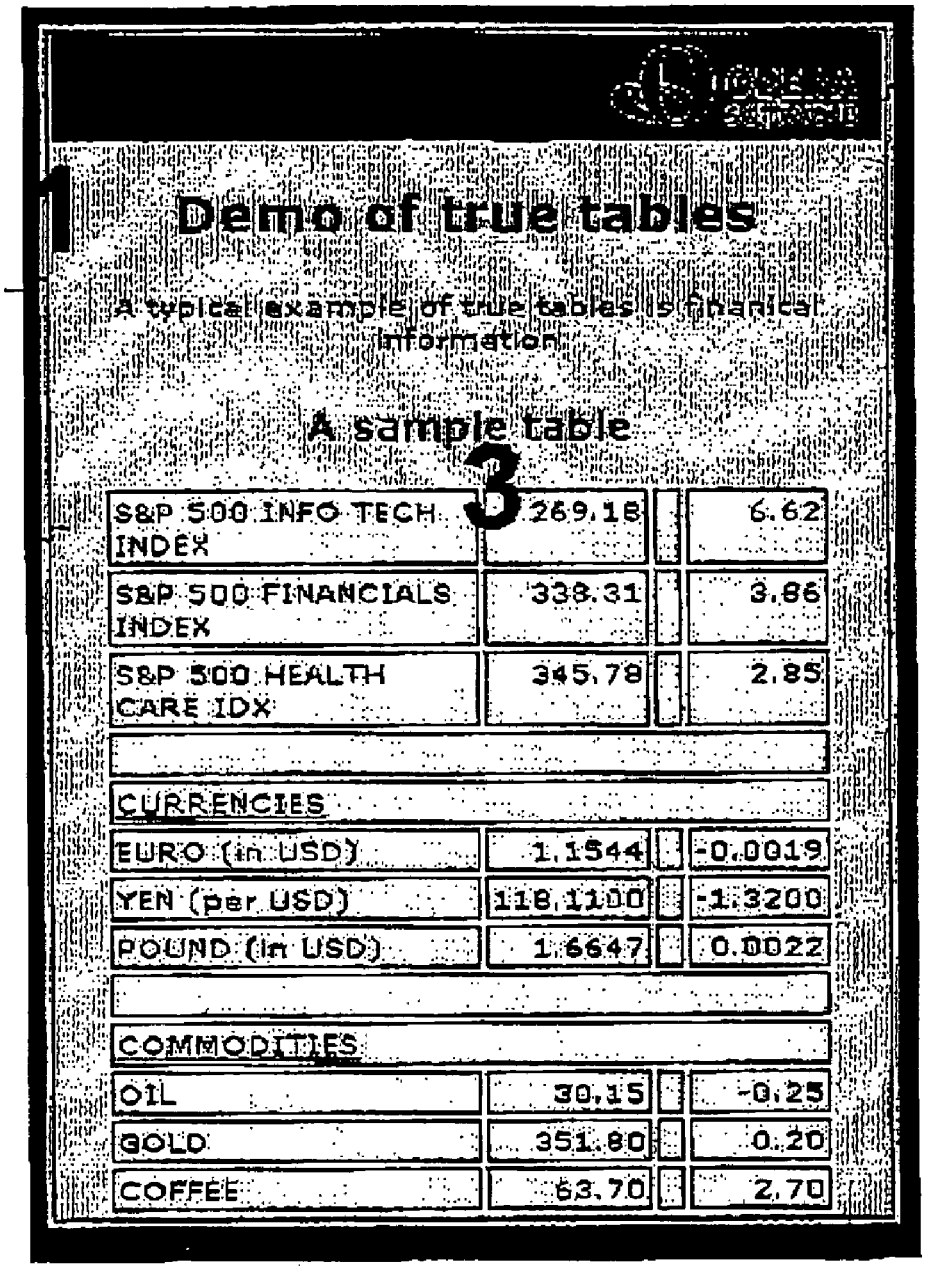

FIG. 3 (screenshot) depicts an example of a Web page with a non-true table and a true table, each displayed with its original table structure, according to prior art.

A non-true table or design table is indicated at 301. Another non-true table or design table is indicated at 302. The purpose of the tables 301, 302 is to provide a particular design, such as a page background or a center alignment.

A true table, containing financial data from the stock market, is indicated at 303.

Figure 4:

FIG. 4 (screenshot) depicts the Web page, displayed on a narrow display, wherein both table structures are rejected and the content is displayed without its original table structure.

The non-true table or design table indicated at 301 in FIG. 4 appears as non-table data 401. The non-true table or design table indicated at 302 in FIG. 4 appears as non-table data 402. The true table containing financial data, indicated at 303 in FIG. 3, appears as unstructured, non-table data 403, which has a poor readability.

Figure 5:

FIG. 5 (screenshot) depicts the Web page, displayed on a narrow display, wherein the structure of the non-true table is rejected, while the structure of the true table is maintained, according to the invention.

The non-true table or design table indicated at 301 in FIG. 4 appears as non-table data 501. The non-true table or design table indicated at 302 in FIG. 4 appears as non-table data 502. The true table containing financial data, indicated at 303 in FIG. 3, appears as a structured table data 503, which has a superior readability, compared to the screenshot in FIG. 4.

The method, the client terminal, or the computer program according to the present invention leads to useful results. In particular, (X)HTML content is displayed in an intelligible, efficient, and user-friendly way on a narrow display, including a display with limited horizontal resolution.

In the detailed description above, the present invention has been disclosed by way of a preferred embodiment, with the addition of some possible further features and alternatives. However, the person skilled in the art will realize that many other modifications and variations exist within the scope of the invention, as set forth in the appended set of claims.

Although the client terminal 100 in the disclosed embodiment is specified as a mobile terminal such as a mobile telephone or a PDA, it will readily be recognized that the client terminal 100 may alternatively be a television receiver adapted for Web-browsing purposes. In this case the display 110 is not particularly narrow, but it has a reduced horizontal resolution compared to a common computer screen. In such a television client terminal the communication adapter 130 may be a modem or broadband adapter, rather than a wireless or mobile communication device.

The person skilled in the art will readily recognize that the sequence of the test steps 218, 220, and 224 are mutually independent, and that the illustrated sequence is given by example. An identical result will arise if the three steps are performed in any one of the orders 218-224-220, 220-218-224, 220-224-218, 224-218-220, or 224-220-218. Likewise, the steps may be performed concurrently or virtually simultaneously. However, the calculating step 222 must of course be performed before the test step 224 is activated.

It should also be noted that not all the tests performed in the steps 218, 220, and 224 are necessary to obtain a proper determination if the table is a true table or a non-true table. In particular, step 216 is a preferred feature that may be omitted. The required features of the invention appear from the appended set of claims.

The invention claimed is:

1. A method for presenting a markup language document which includes a table on a display, the method comprising
   determining the density of numeric cells among the cells in the table and establishing the table as a non-true table if the density of numeric cells is less than a predetermined percentage value, and
   if the table is determined to be a non-true table, formatting the table by rejecting the table structure and presenting the content of the table as linear structure on the display; and
   if the table is determined to be a true table,
presenting the content of the table, including its table structure, on the display.

2. Method according to claim 1,
   wherein the predetermined percentage value is in the range 20 to 60 percent.

3. Method according to claim 2,
   wherein said predetermined percentage value is in the range 30 to 50 percent.

4. Method according to claim 3,
   wherein said predetermined percentage value is approximately 40 percent.

5. Method according to claim 1,
   wherein said step of determining the density of numeric cells comprises the steps of
      determining the total number $n_{tot}$ of cells in the table,
      determining the number $n_{num}$ of cells containing a majority of numeric characters, and
      establishing said density as a fraction $n_{num}/n_{tot}$.

6. Method according to claim 5,
wherein the characters "0" through "9" and "+", "−", "%" and "." are considered as numeric characters.

7. Method according to claim 1,
wherein said step of determining if the table is a non-true table further comprises the substeps of
determining if an element type in the table is included in a predetermined list of non-allowable element types, and
establishing the table as a non-true table if the element type is included in said list.

8. Method according to claim 7,
wherein said predetermined list of non-allowable element types includes one or more of tables, large images, and movie elements.

9. Method according to claim 1, further comprising the step of removing styling from the table in order to minimize the size of the table.

10. Method according to claim 1, further comprising the step of applying text breaking within the table.

11. Client terminal for presenting on a display a markup language document containing a table, comprising
a processing unit,
a memory,
a display unit,
wherein said processing unit is arranged for performing a method according to claim 1.

12. Computer program, embodied on a computer-readable medium or in a memory, comprising computer instructions which, when executed by a processing unit, performs a method according to claim 1.

13. Computer program according to claim 12, further comprising a web browser.

14. Client terminal for determining if a table in a markup language document is a true table or a non-true table, comprising:
a processing unit,
a memory,
a display unit,
wherein said processing unit is arranged for determining a density of numeric cells among the cells in the table, and establishing the table as a non-true table if the density of numeric cells is less than a predetermined percentage value.

15. Computer program, embodied on a computer-readable medium or in a memory, comprising computer instructions which, when executed by a processing unit performs a method for determining if a table in a markup language document is a true table or a non-true table, the method comprising:
determining a density of numeric cells among the cells in the table, and
establishing the table as a non-true table if the density of numeric cells is less than a predetermined percentage value.

16. Computer program according to claim 15, wherein the computer program further comprises a web browser.

\* \* \* \* \*